United States Patent
Hayashi et al.

(10) Patent No.: US 11,485,803 B2
(45) Date of Patent: Nov. 1, 2022

(54) METHOD FOR DEODORIZING HYDROGENATED PETROLEUM RESIN, AND METHOD FOR PRODUCING HYDROGENATED PETROLEUM RESIN

(71) Applicant: MARUZEN PETROCHEMICAL CO., LTD., Chuo-ku (JP)

(72) Inventors: Tomoki Hayashi, Ichihara (JP); Yoshikazu Iijima, Ichihara (JP); Keisuke Matsushita, Ichihara (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 73 days.

(21) Appl. No.: 17/041,773

(22) PCT Filed: Mar. 27, 2019

(86) PCT No.: PCT/JP2019/013078
§ 371 (c)(1),
(2) Date: Sep. 25, 2020

(87) PCT Pub. No.: WO2019/189296
PCT Pub. Date: Oct. 3, 2019

(65) Prior Publication Data
US 2021/0024663 A1    Jan. 28, 2021

(30) Foreign Application Priority Data

Mar. 28, 2018  (JP) .............. JP2018-061566

(51) Int. Cl.
| C08F 6/10 | (2006.01) |
| C08F 8/04 | (2006.01) |
| C08F 212/08 | (2006.01) |
| C08F 232/04 | (2006.01) |
| C08F 232/08 | (2006.01) |
| C08F 240/00 | (2006.01) |

(52) U.S. Cl.
CPC .................. *C08F 8/04* (2013.01); *C08F 6/10* (2013.01); *C08F 212/08* (2013.01); *C08F 232/04* (2013.01); *C08F 232/08* (2013.01); *C08F 240/00* (2013.01)

(58) Field of Classification Search
CPC ....................................................... C08F 6/10
See application file for complete search history.

(56) References Cited

U.S. PATENT DOCUMENTS

| 2,911,395 A | 11/1959 | Small |
| 5,171,793 A | 12/1992 | Johnson et al. |
| 2016/0319047 A1 | 11/2016 | Miyamoto et al. |
| 2017/0096501 A1 | 4/2017 | Iijima et al. |

FOREIGN PATENT DOCUMENTS

| CN | 105985806 A | 10/2016 |
| EP | 0 666 273 A2 | 8/1995 |
| JP | 5-504592 A | 7/1993 |
| JP | 2004-35724 A | 2/2004 |
| JP | 2015-124246 A | 7/2015 |
| WO | 4674089 B2 | 4/2011 |
| WO | WO 2015/147027 A1 | 10/2015 |
| WO | WO 2019/172434 A1 | 9/2019 |

OTHER PUBLICATIONS

International Search Report dated Jun. 11, 2019 in PCT/JP2019/013078 filed Mar. 27, 2019, 1 page.
Extended European Search Report dated Dec. 5, 2021 in European Patent Application No. 19776120.8, 5 pages.

*Primary Examiner* — Catherine S Branch
(74) *Attorney, Agent, or Firm* — Oblon, McClelland, Maier & Neustadt, L.L.P.

(57) ABSTRACT

Provided is a new method that effectively reduces odor components that are present in a hydrogenated petroleum resin, and adjusts a softening point to an appropriate range for exhibiting an adhesive performance.
A method for deodorizing a hydrogenated petroleum resin, includes stripping a hydrogenated petroleum resin at a gas flow rate of 1 to 45 VVM.

3 Claims, No Drawings

METHOD FOR DEODORIZING HYDROGENATED PETROLEUM RESIN, AND METHOD FOR PRODUCING HYDROGENATED PETROLEUM RESIN

TECHNICAL FIELD

The present invention relates to a method for deodorizing a hydrogenated petroleum resin and a method for producing a hydrogenated petroleum resin. More specifically, the present invention relates to a method for deodorizing and a method for producing a dicyclopentadiene/vinyl aromatic compound hydrogenated petroleum resin obtained by hydrogenating a thermal polymerization reaction product of dicyclopentadiene and a vinyl aromatic compound.

BACKGROUND ART

A hot melt adhesive is excellent in, for example, high-speed coating properties, fast setting properties, solvent-free properties, barrier properties, energy saving properties, and economic efficiency, and thus is increasingly used as an adhesive for, for example, sanitary materials, packaging materials, automobiles in various fields.

A dicyclopentadiene/vinyl aromatic compound hydrogenated petroleum resin obtained by hydrogenating a thermal polymerization reaction product of dicyclopentadiene and a vinyl aromatic compound is useful as a raw material (a tackifier) of, for example, a hot melt adhesive as described above. However, in a crude hydrogenated petroleum resin, volatile components such as unreacted monomers, solvents, and low molecular weight substances remain or are present.

Some of these volatile components cause deterioration of the quality of the product, and thus need to be removed to the extent that they do not affect the quality. Removal of odor components is important, in particular, for use as an adhesive for sanitary materials. In particular, if there are residual odor components having a molecular weight of 300 or less, it is the main cause of an odor.

Meanwhile, as a method for removing volatile components from a reaction mixture, a method in which a thin film evaporator is used is generally employed (Patent Literature 1).

CITATION LIST

Patent Literature

Patent Literature 1: WO 2015/147027 A1
Patent Literature 2: JP 4674089 B2
Patent Literature 3: JP-A 2004-35724

SUMMARY OF INVENTION

Technical Problem

However, when volatile components are removed from a hydrogenated petroleum resin by using a thin film evaporator, there is a problem that the softening point is excessively increased, and thus adhesive performance tends to be difficulty exhibited. Further, odor components are not sufficiently removed, and thus the resin from which the volatile components have been removed by this method is difficulty used as a tackifier for a hot melt adhesive for sanitary materials.

As a method for removing volatile components other than the method in which a thin film evaporator is used, a method in which an evaporator or stripping is used is known (Patent Literatures 2 and 3). However, a method in which an evaporator is used has a problem that it is not suitable for a process on an industrial scale. No attempt has been made so far to reduce the odor components remaining in a hydrogenated petroleum resin by stripping.

Under such circumstances, the present inventors tried to strip a hydrogenated petroleum resin at a high gas flow rate to effectively reduce odor components that are present in the hydrogenated petroleum resin and found that though odor components can be removed, the softening point excessively increases as in the case of using a thin film evaporator.

It is an object of the present invention to provide a new method that can effectively reduce odor components that are present in a hydrogenated petroleum resin, and adjust a softening point to an appropriate range for exhibiting an adhesive performance.

Solution to Problem

The present inventors intensively studied to solve the above-mentioned problems. As a result of that, they found that by stripping a hydrogenated petroleum resin at a gas flow rate of 1 to 45 VVM, odor components that are present in the hydrogenated petroleum resin can be effectively reduced, and the softening point for exhibiting adhesive performance can be adjusted to an appropriate range, thereby completing the present invention.

That is, the present invention provides <1> to <4> below.
<1> A method for deodorizing a hydrogenated petroleum resin, including: stripping a hydrogenated petroleum resin at a gas flow rate of 1 to 45 VVM.
<2> The method for deodorizing a hydrogenated petroleum resin according to <1>, wherein the stripping is performed at 150 to 250° C.
<3> The method for deodorizing a hydrogenated petroleum resin according to <1> or <2>, wherein the stripping is performed at 160 to 240° C.
<4> A method for producing a hydrogenated petroleum resin, including: thermally polymerizing dicyclopentadiene and a vinyl aromatic compound, hydrogenating the obtained polymerization reaction product, and then stripping the obtained hydrogenated petroleum resin at a gas flow rate of 1 to 45 VVM.

Advantageous Effects of Invention

According to the method for deodorizing a hydrogenated petroleum resin of the present invention, odor components can be effectively reduced. Further, the softening point for exhibiting adhesive performance can be adjusted to an appropriate range.

According to the method for producing a hydrogenated petroleum resin of the present invention, it is possible to produce a hydrogenated petroleum resin having a softening point adjusted to an appropriate range for exhibiting adhesive performance while efficiently removing odor components.

DESCRIPTION OF EMBODIMENTS

[Method for Deodorizing Hydrogenated Petroleum Resin]

The method for deodorizing a hydrogenated petroleum resin of the present invention includes stripping a hydrogenated petroleum resin at a gas flow rate of 1 to 45 VVM.

Examples of the hydrogenated petroleum resin to be stripped include a dicyclopentadiene/vinyl aromatic compound hydrogenated petroleum resin. Further, preferably, 80% by mass or more of the liquid phase to be stripped is a hydrogenated petroleum resin, and more preferably, 90% by mass or more is a hydrogenated petroleum resin.

The dicyclopentadiene/vinyl aromatic compound hydrogenated petroleum resin means a resin obtained by hydrogenating a thermal polymerization reaction product of dicyclopentadiene and a vinyl aromatic compound. Specifically, the same hydrogenated petroleum resin as that to be stripped in the method for producing a hydrogenated petroleum resin described below can be used.

Stripping means a method of blowing a gas into a product such as a resin to remove volatile components remaining in the product together with the gas to the outside of the system. Examples of the gas used for stripping include inert gases such as nitrogen and water vapor.

Though the gas flow rate is 1 to 45 VVM, from the viewpoint of enhancing the desired effect, it is preferably 2.5 to 40 VVM, more preferably 5 to 35 VVM.

VVM means "volume per volume per minute", that is, the gas flow rate per unit volume per minute.

From the viewpoint of enhancing the desired effect, stripping is preferably performed at 150 to 250° C., more preferably 155 to 240° C., further more preferably 160 to 210° C., and particularly preferably 160 to 190° C. By using a stripping tank equipped with a heating unit, the temperature can be easily adjusted.

Though the pressure is not particularly limited, it is preferably 1 kPa or more, more preferably 3 kPa or more, and is preferably 120 kPa or less, more preferably 101.3 kPa or less.

Stripping treatment time is usually 10 to 180 minutes, preferably 10 to 90 minutes.

Stripping can be performed while stirring the hydrogenated petroleum resin. Stirring is preferably performed at 50 to 5000 rpm when stirring is performed.

Examples of the device used for stripping include a stirring tank, a bubble column, and a plate column.

The concentration of the odor component having a molecular weight of 300 or less that is present in the hydrogenated petroleum resin after deodorization is preferably 100 ppm or less, more preferably 50 ppm or less, and particularly preferably 25 ppm or less for each component. When a resin having a concentration of the odor component of more than 100 ppm is used as a raw material for hot melt adhesives for sanitary materials, odor components derived from the resin may remain in the product.

In the present specification, the odor component having a molecular weight of 300 or less means a multimer of cyclopentadiene, a multimer of a vinyl aromatic compound, a reaction product of cyclopentadiene and a vinyl aromatic compound, and the hydrogenated product thereof, a solvent having a molecular weight of 300 or less of the solvents used in the thermal polymerization step or hydrogenation step (specific examples of the solvent will be described later).

The concentration of the odor component having a molecular weight of 300 or less can be measured in the same manner as in Examples described later.

The softening point of the hydrogenated petroleum resin after deodorization is preferably 90 to 105° C. from the viewpoint of exhibition of adhesive performance and suitability as a material for a hot melt adhesive for sanitary materials.

[Method for Producing Hydrogenated Petroleum Resin]

The method for producing a hydrogenated petroleum resin of the present invention includes: thermally polymerizing dicyclopentadiene and a vinyl aromatic compound, hydrogenating a polymerization reaction product, and stripping an obtained hydrogenated petroleum resin at a gas flow rate of 1 to 45 VVM.

(A) Thermal Polymerization Step

The method for producing a hydrogenated petroleum resin of the present invention includes the step of thermally polymerizing dicyclopentadiene and a vinyl aromatic compound. In this thermal polymerization step, dicyclopentadiene and a vinyl aromatic compound are thermally polymerized to obtain a polymerization reaction product.

(A-1) Preliminary Reaction Step

In the method for producing a hydrogenated petroleum resin of the present invention, a preliminary reaction can be performed before the thermal polymerization.

Examples of the preliminary reaction include a reaction in which dicyclopentadiene is reacted with a vinyl aromatic compound represented by Formula (1) below to obtain a reaction solution containing a phenylnorbornene derivative represented by Formula (2) below, a reaction product thereof.

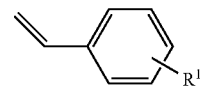

(1)

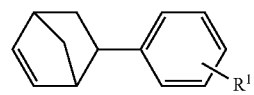

(2)

In Formulas (1) and (2), $R^1$ represents a hydrogen atom, an alkyl group, a cycloalkyl group, an aryl group or an aralkyl group, and is preferably a hydrogen atom.

The alkyl group represented by $R^1$ is preferably an alkyl group having 1 to 10 carbon atoms, and more preferably an alkyl group having 1 to 7 carbon atoms. The alkyl group can be linear or branched, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an isohexyl group, and an n-heptyl group.

As the cycloalkyl group, a cycloalkyl group having 3 to 7 carbon atoms is preferable. Examples thereof include a cyclopentyl group, a cyclohexyl group, and a cycloheptyl group.

Examples of the aryl group include an aryl group having 6 to 12 carbon atoms such as a phenyl group, a tolyl group, a xylyl group, and a naphthyl group. Examples of the aralkyl group include an aralkyl group having 7 to 20 carbon atoms such as a benzyl group, a phenethyl group, and a naphthylmethyl group.

Specific examples of the vinyl aromatic compound used in the present invention include styrene, p-methylstyrene, and p-tert-butylstyrene, and the vinyl aromatic compound is preferably styrene. The vinyl aromatic compound can contain a stabilizer such as a polymerization inhibitor.

The dicyclopentadiene used in the present invention is not particularly limited, and for example, a high-purity dicyclopentadiene fraction containing 30 to 100% by mass of dicyclopentadiene or a crude dicyclopentadiene fraction can be used as a dicyclopentadiene raw material. A mixture of dicyclopentadiene and cyclopentadiene can be also used.

Among such dicyclopentadiene raw materials, those having a high concentration of reactive components such as dicyclopentadiene and codimer are preferable in terms of the yield of the resin obtained by thermal polymerization. However, an inexpensive crude dicyclopentadiene fraction containing non-reactive components such as C5 and C6 paraffins can also be used.

Though the preliminary reaction can be performed without using a reaction solvent, the composition can be adjusted by adding a solvent.

As such a solvent, for example, aromatic solvents such as benzene, toluene, and xylene; naphthene solvents such as cyclohexane, dimethylcyclohexane (hereinafter referred to as DMCH), and ethylcyclohexane can be suitably used.

The preliminary reaction between the vinyl aromatic compound and dicyclopentadiene is preferably performed at 170° C. or higher. When the reaction temperature is 170° C. or higher, dicyclopentadiene is sufficiently thermally decomposed and the progress of the reaction is promoted, so that the phenylnorbornene derivative is efficiently produced.

From the viewpoint of adjusting the concentration of the vinyl aromatic compound in the reaction system to the low level and suppressing the production of the homopolymer of the vinyl aromatic compound, it is preferable to perform the reaction by adding dropwise (addition in portions or continuous addition) a liquid containing a vinyl aromatic compound into dicyclopentadiene heated to 170° C. or higher.

Specifically, it is preferable that a predetermined amount of dicyclopentadiene be previously placed in a reaction vessel, and it is heated to the reaction temperature above, and then a liquid containing a vinyl aromatic compound be dividedly or continuously added dropwise for the reaction while maintaining the temperature.

The liquid to be added dropwise can contain only a vinyl aromatic compound, or can contain a vinyl aromatic compound and dicyclopentadiene, and other solvents. As the dicyclopentadiene, the above-mentioned dicyclopentadiene raw material can be used. The dicyclopentadiene previously placed in the reaction vessel and the dicyclopentadiene used in the added dropwise liquid may have the same composition or different compositions.

The ratio of the amount used of dicyclopentadiene to be previously placed in the reaction vessel to the amount used of the addition dropwise solution, and the ratio of the amount used of the dicyclopentadiene to the amount used of a vinyl aromatic compound in the added dropwise liquid when the added dropwise liquid contains dicyclopentadiene are appropriately set according to the target value of the aromatic content of the resin obtained. The added dropwise liquid is preferably in the range of 20 to 150 parts by mass relative to 100 parts by mass of the amount placed in the reaction vessel. When the amount used of the added dropwise liquid is 20 parts by mass or more, the aromatic content of the obtained resin will be sufficient. When the amount used of the added dropwise liquid is 150 parts by mass or less, the concentration of the vinyl aromatic compound at the time of addition dropwise is low, and further the local temperature increase due to the heat of reaction is suppressed, so that the decrease in the selectivity of the phenylnorbornene derivative can be prevented.

The amount of all dicyclopentadiene supplied to the reaction system with the vinyl aromatic compound can be appropriately selected according to the target value of the aromatic content of the resin obtained. The vinyl aromatic compound is preferably 15 to 130 parts by mass, more preferably 30 to 90 parts by mass relative to 100 parts by mass of dicyclopentadiene.

The time for addition dropwise is preferably 1 to 4 hours. When addition dropwise time is 1 hour or more, the concentration of the vinyl aromatic compound in the reaction solution system is low, and further the rapid temperature increase due to the heat of reaction is suppressed, so that the decrease in the selectivity of the phenylnorbornene derivative can be prevented. Thereby, homopolymers tend not to be produced in the subsequent polymerization step. When the addition dropwise time is 4 hours or less, homopolymerization of dicyclopentadiene tends not to proceed. Thereby, high molecular weight substances tend not to be produced in the subsequent polymerization step.

The addition dropwise is preferably performed while stirring the system so that the temperature in the reaction vessel is kept uniform and the concentration of the vinyl aromatic compound does not locally increase.

(A-2) Polymerization Step

Examples of the thermal polymerization include thermal polymerization in which the reaction solution containing the phenylnorbornene derivative obtained in the preliminary reaction is heated to 240 to 300° C.

The thermal polymerization at 240 to 300° C. facilitates the reaction at an appropriate polymerization rate. From the viewpoint of the polymerization rate, the temperature is more preferably 250 to 280° C. The polymerization time is preferably 0.5 to 4 hours, more preferably 1 to 3 hours.

The thermal polymerization can be performed without a solvent as follows: the reaction solution in the reaction vessel used in the preliminary reaction is kept and heated to polymerization temperature. The reaction solution obtained in the preliminary reaction can be transferred to another polymerization vessel to be thermally polymerized.

When the reaction vessel used in the preliminary reaction is heated to the polymerization temperature, the rate of temperature increase is preferably 1.5° C./min or more from the viewpoint of preventing the resin obtained by thermal polymerization from having a high molecular weight.

(B) Hydrogenation Step

The method for producing a hydrogenated petroleum resin of the present invention includes the step of hydrogenating a polymerization reaction product obtained in the thermal polymerization step. A hydrogenated petroleum resin is obtained by this method. This hydrogenation step is preferably performed in the presence of a catalyst.

(B-1) Monomer/Oligomer Removal Step

The polymerization reaction product can be subjected to the hydrogenation step as it is, or can be subjected to the hydrogenation step after removal of unreacted monomer components and low molecular weight polymerization products in the obtained polymerization reaction product. The method for separating/removing, for example, monomer components is not particularly limited, and for example, a flash distillation device and a thin film evaporator can be suitably used.

The polymerization reaction product can be used as a hydrogenation raw material by adding a solvent (also referred to as a hydrogenation solvent) to dilute the polymerization reaction product. For example, aromatic solvents such as benzene, toluene, and xylene; naphthene solvents such as cyclohexane, DMCH, and ethylcyclohexane can be suitably used.

The polymerization reaction product and the hydrogenation raw material can be subjected to the hydrogenation step as it is, or can be subjected to the hydrogenation step after removal of the dicyclopentadiene oligomer (hereinafter referred to as a DCPD oligomer) contained in the obtained polymerization reaction product or the hydrogenation raw material. The DCPD oligomer is insoluble in many general-purpose solvents at room temperature (25° C.). Examples of the method for separating/removing the DCPD oligomer include a method of cooling the polymerization reaction product or the hydrogenation raw material to a temperature of 10 to 40° C. to remove the precipitate by solid-liquid separation, and a method of heating the polymerization reaction product or hydrogenation raw material to about 120° C. or higher to dissolve the DCPD oligomer and contacting it with an adsorbent.

When the DCPD oligomer is removed by solid-liquid separation, the removal efficiency of the DCPD oligomer is improved by the temperature of 10 to 40° C. as described above.

The method for removing the precipitate by solid-liquid separation is not particularly limited, and for example, a filtration device, a centrifugal sedimentation separator, and a sedimentation device can be suitably used. Examples of the filtration device include a cross flow filtration device and a celite filter device. Examples of the centrifugal sedimentation separator include a disc centrifugal sedimentation separator and a decanter centrifugal sedimentation separator. Examples of the sedimentation device include a continuous thickener. Among these, a disc-type centrifuge is suitable as a device that can be used efficiently and continuously without using auxiliary materials.

Meanwhile, when the DCPD oligomer is contacted with an adsorbent, the DCPD oligomer is easily dissolved and the adsorption efficiency is improved at the temperature of 120° C. or higher.

The method for contacting the polymerization reaction product or the hydrogenation raw material with the adsorbent is not particularly limited, and for example, a batch reactor or a flow continuous reactor can be used.

The adsorbent is not limited, and examples thereof include activated clay, silica gel, silica-alumina, activated alumina, activated carbon, zeolite, and diatomaceous earth. The preferable adsorbent is spherical activated alumina of 2 to 4 mm particles.

(B-2) Hydrogenation Step

The method for hydrogenating the polymerization reaction product or the hydrogenation raw material is not particularly limited, and for example, a batch reactor or a flow continuous reactor can be used.

When a batch reactor is used, the reaction conditions are as follows: the temperature is usually 200 to 300° C., preferably 200 to 270° C., the reaction pressure is usually 0 to 10 MPaG (G is a gauge pressure. The same applies hereinafter.), preferably 1 to 7 MPaG, and the reaction time is usually 0.5 to 8 hours, preferably 1 to 5 hours.

As the flow continuous reactor, a fixed bed flow reactor is preferable, and a trickle flow reactor with parallel flow of liquid gas is more preferable. The reaction conditions are as follows: the temperature is usually 100 to 300° C., preferably 120 to 250° C., the reaction pressure is usually 0 to 10 MPaG, preferably 0.1 to 5 MPaG, and the LHSV (liquid hourly space velocity) is usually 0.5 to 20 $[h^{-1}]$, preferably 1 to 20 $[h^{-1}]$. The number of the flow reactor is not limited, and divided hydrogenation with two or more columns is also possible.

The hydrogenation step is preferably performed in the presence of a catalyst.

As the catalyst used in the hydrogenation step, generally known catalysts such as nickel, palladium, cobalt, platinum, and rhodium catalysts can be suitably used, and nickel or palladium catalysts are more preferable.

Specific examples of the catalyst include, in addition to transition element catalysts represented by, for example, nickel, palladium, cobalt, platinum, and rhodium, those in which these catalysts are supported on any carrier.

Examples of the carrier include alumina, silica, silica-alumina, zeolite, clay minerals (such as montmorillonite), and silicon carbide.

(C) Hydrogenation Solvent Recovery Step

When the polymerization reaction product is diluted with a hydrogenation solvent and the hydrogenation raw material is hydrogenated, the hydrogenation solvent is preferably separated/recovered from the hydrogenated petroleum resin. This hydrogenation solvent recovery step is preferably performed before the deodorization step.

The method for separating/recovering the hydrogenation solvent is not particularly limited, and for example, a flash distillation device and a thin film evaporator can be suitably used. The temperature at this time is usually 150 to 250° C., preferably 170 to 220° C. The pressure is usually 200 kPa or less, preferably 20 to 150 kPa. When the step is performed at a temperature of 220° C. or less and a pressure of 20 kPa or higher, the amount of low molecular weight substances can be reduced.

(D) Stripping Step

The method for producing a hydrogenated petroleum resin of the present invention includes the step of stripping the hydrogenated petroleum resin obtained above at a gas flow rate of 1 to 45 VVM.

This stripping step can be performed in the same manner as in the "method for deodorizing hydrogenated petroleum resin of the present invention" described above. By the stripping step, for example, odor components such as unreacted monomer components, low molecular weight substances, and residual solvents can be efficiently removed from the hydrogenated petroleum resin obtained in the hydrogenation solvent recovery step.

The stripping can be performed in combination with a treatment with other evaporation devices such as a thin film evaporator, as needed.

EXAMPLES

Hereinafter, the present invention will be described in detail with reference to Examples, and the present invention is not limited to these Examples.

The physical properties, for example, of the obtained resin were determined by the following methods.

(1) Molecular Weight Measurement

The molecular weight (weight average molecular weight Mw, number average molecular weight Mn, and Z-average molecular weight Mz) and molecular weight distribution (Mw/Mn) were determined in terms of polystyrene using a high-speed GPC instrument (HLC-8320GPC, manufactured by TOSOH CORPORATION) [Eluent: tetrahydrofuran, Column: G4000HXL, G3000HXL, G2000HXL (two) manufactured by Tosoh Corporation are used in series, detector: RI, standard sample: polystyrene].

(2) Softening Point Measurement

The softening point was measured by ring-and-ball method in accordance with JIS-2207 (1991). If a softening point falls within the range of 90 to 105° C., it can be regarded as the temperature range suitable for exhibiting the adhesive performance.

(3) Odor Component Concentration Measurement

The concentration of the odor component having a molecular weight of 300 or less in the resin was determined in terms of ethylcyclohexane using the headspace method.

Analytical instruments: GC-2010 (manufactured by SHIMADZU CORPORATION), GCMS-QP2010Plus (manufactured by SHIMADZU CORPORATION), TurboMatrixHS (manufactured by PerkinElmer)

Ionization: EI (electron ionization)

Column used: InertCap5MS/Sil (inner diameter: 0.25 mm, length: 30 m, film thickness: 1.00 μm)

Analytical conditions: headspace temperature: held at 180° C. for 30 minutes, injection temperature: 250° C., column temperature: held at 100° C. for 10 minutes, then increased at 10° C./minute, and held at 250° C. for 10 minutes, detector temperature: 260° C.

Multimers of cyclopentadiene, multimers of a vinyl aromatic compound, reaction products of cyclopentadiene and a vinyl aromatic compound, and hydrogenated products thereof, as well as solvents were identified from the peak and peak intensity obtained by GCMS measurement, and the concentration of odor components were determined from the calibration curve of ethylcyclohexane.

When the concentration of each odor component was 100 ppm or less, the concentration of odor components in the resin was regarded to have been sufficiently reduced.

(4) Turbidity Measurement

The turbidity was measured using a HACH turbidimeter (2100N) with a 90° scattered light detector of tungsten lamp light, a transmitted light detector, and a forward scattered light detector. A calibration curve was prepared from the standard solution of formazine, and the value of the sample was converted into turbidity in NTU as relative turbidity. As a pretreatment of the measurement sample, it was cooled in a refrigerator at 8° C. for 13 hours or more to precipitate the DCPD oligomer sufficiently, and then was held in a constant temperature bath at 25° C. for 1 hour or more to measure the turbidity.

Example 1

Production Example of Hydrogenated Petroleum Resin (1)

(Thermal Polymerization Step)

Dicyclopentadiene fraction (concentration: 75% by mass) (3.09 t) was placed in a polymerization reaction tank having an inner volume of 8.6 m³, and the inside of the system was purged with nitrogen. Then, the temperature was increased to 180° C. at 4° C./min. While maintaining the temperature at 180° C., a mixed solution of 0.92 t of styrene and 0.80 t of dicyclopentadiene fraction of the same type as above was added dropwise over 2 hours.

After the completion of addition dropwise, the temperature was increased to 260° C. at 1.8° C./min. Then, the mixture was continuously heated at 260° C. for 92 minutes to perform a polymerization reaction.

The polymerization reaction product was placed in a flash tower and treated at 230° C. and 0.1 MPa to remove unreacted monomers. Then, the polymerization reaction product was treated at 230° C. and 6.5 kPa in the flash tower to partially remove low molecular weight substances, thereby a resin was obtained. At this time, the molecular weight of the resin was Mz=1830 and Mw/Mn=2.29.

(Hydrogenation Step)

DMCH was added to the obtained polymerization reaction product to dilute the obtained polymerization reaction product to a resin concentration of 15.0% by mass.

The diluted solution was cooled to 25° C. to precipitate the DCPD oligomer, and was subjected to a centrifugal sedimentation separator at a flow rate of 600 g/min for solid-liquid separation to remove the DCPD oligomer, thereby a hydrogenation raw material was obtained. Disc-type centrifuge ADS-250MS (rotation speed: 10000 rpm) manufactured by SAITO SEPARATOR LIMITED was used for solid-liquid separation. The turbidity obtained at this time was 10.0 NTU.

Using the obtained hydrogenation raw material, 3-stage continuous hydrogenation with a palladium catalyst was performed to obtain a hydrogenated petroleum resin. That is, the liquid was passed through a fixed bed flow reactor filled with a palladium-supported alumina catalyst (gas-liquid co-current flow, downflow) to perform a hydrogenation reaction at a temperature of 120° C., a hydrogen pressure of 0.5 MPaG, and LHSV of 17 [h⁻¹]. Then, using the same fixed bed flow reactor, a hydrogenation reaction was performed at a temperature of 215° C., a hydrogen pressure of 0.75 MPaG, and LHSV of 1.0 [h⁻¹]. Further, using the same fixed bed flow reactor, a hydrogenation reaction was performed at a temperature of 215° C., a hydrogen pressure of 0.75 MPaG, and LHSV of 2.1 [h⁻¹].

(Hydrogenation Solvent Recovery Step)

After the hydrogenation reaction, 15 kg of a reaction solution having a resin concentration of 15.0% by mass was taken out and treated with a thin film evaporator at a temperature of 190° C. and a pressure of 101.3 kPa for 210 minutes to separate and recover the hydrogenation solvent. As the thin film evaporator, a thin film evaporator having an evaporation part made of borosilicate glass and an evaporation area of 0.1 m² was used. Thereby, a hydrogenated petroleum resin having a resin concentration of 99% by mass was obtained.

(Deodorization Step)

To a 200 mL separable flask, 130 g of the hydrogenated petroleum resin having a resin concentration of 99% by mass was placed, and the inside of the system was purged with nitrogen. Nitrogen was flowed at 5.3 VVM, and the pressure of the inside of the system was set to 3 kPa. Then, the temperature was increased to 190° C. at 8° C./min. Then, stripping was performed for 45 minutes at a temperature of 190° C., a pressure of 3 kPa, 5.3 VVM, and a stirring rate of 200 rpm. The results are shown in Table 1.

Example 2

Production Example of Hydrogenated Petroleum Resin (2)

(Thermal Polymerization Step)

865 g of Dicyclopentadiene fraction (concentration: 74% by mass) and 935 g of xylene were placed in an autoclave having an internal volume of 5 L and equipped with a stirrer, and the inside of the system was purged with nitrogen. Then, the temperature was increased to 260° C. at 4° C./rain while stirring at 500 rpm. While maintaining the temperature at 260° C., a mixed solution of 455 g of styrene and 545 g of xylene was added dropwise over 2 hours. Then, the mixture was continuously heated at 260° C. for 3 hours to perform a polymerization reaction. Thereby, a polymerization reaction product was obtained. At this time, the molecular weight of the resin was Mz=1760 and Mw/Mn=1.99.

The polymerization reaction product was treated at a temperature of 230° C. under a nitrogen stream for 15 minutes using a rotary evaporator to remove unreacted monomers. Then, the polymerization reaction product was treated at a temperature of 230° C. and a pressure of 6.7 kPa for 10 minutes to partially remove low molecular weight substances, thereby a resin was obtained.

(Hydrogenation Step)

DMCH was added to the obtained polymerization reaction product to dilute the obtained polymerization reaction product to a resin concentration of 47.2% by mass, thereby a hydrogenation raw material was obtained.

Using this hydrogenation raw material, a hydrogenated resin was obtained with a batch reactor using a nickel catalyst. That is, 500 g of a hydrogenation raw material and 0.35 g of a nickel-supported silica-alumina catalyst were placed in an autoclave having an internal volume of 1 L and equipped with a stirrer, and the inside of the system was purged with hydrogen. Then, the temperature was increased to 250° C. at 4° C./min while stirring at 500 rpm. Then, a hydrogenation reaction was performed at 250° C. and 2 MPaG for 5 hours.

(Hydrogenation Solvent Recovery Step)

After the hydrogenation reaction, the reaction solution was taken out and treated with a rotary evaporator at a temperature of 180° C. for 22 minutes under a nitrogen stream to remove the solvent. Thus, a hydrogenated petroleum resin having a resin concentration of 99% by mass was obtained.

(Deodorization Step)

To a 200 mL separable flask, 130 g of the hydrogenated petroleum resin having a resin concentration of 99% by mass was placed, and the inside of the system was purged with nitrogen. Nitrogen was flowed at 5.3 VVM, and the pressure of the inside of the system was set to 3 kPa. Then, the temperature was increased to 200° C. at 8° C./min. Then, stripping was performed for 45 minutes at a temperature of 200° C., a pressure of 3 kPa, 5.3 VVM, and a stirring rate of 200 rpm. The results are shown in Table 1.

Example 3

Production Example of Hydrogenated Petroleum Resin (3)

A hydrogenated petroleum resin was produced in the same manner as in Example 1 except for the deodorization step.

That is, a hydrogenated petroleum resin having a resin concentration of 99% by mass was obtained in the same manner as in Example 1, 130 g of the hydrogenated petroleum resin having a resin concentration of 99% by mass was placed in a 200 mL separable flask, and the inside of the system was purged with nitrogen. Nitrogen was flowed at 14.1 VVM, and the pressure of the inside of the system was set to 3 kPa. Then, the temperature was increased to 190° C. at 8° C./min. Then, stripping was performed for 80 minutes at a temperature of 190° C., a pressure of 3 kPa, 14.1 VVM without stirring. The results are shown in Table 1.

Example 4

Production Example of Hydrogenated Petroleum Resin (4)

A hydrogenated petroleum resin was produced in the same manner as in Example 1 except for the deodorization step.

That is, a hydrogenated petroleum resin having a resin concentration of 99% by mass was obtained in the same manner as in Example 1, 130 g of the hydrogenated petroleum resin having a resin concentration of 99% by mass was placed in a 200 mL separable flask, and the inside of the system was purged with nitrogen. Nitrogen was flowed at 30.0 VVM, and the pressure of the inside of the system was set to 3 kPa. Then, the temperature was increased to 160° C. at 8° C./min. Then, stripping was performed for 45 minutes at a temperature of 160° C., a pressure of 3 kPa, 30.0 VVM, and a stirring rate of 200 rpm. The results are shown in Table 1.

Example 5

Production Example of Hydrogenated Petroleum Resin (5)

A hydrogenated petroleum resin was produced in the same manner as in Example 1 except for the deodorization step.

That is, a hydrogenated petroleum resin having a resin concentration of 99% by mass was obtained in the same manner as in Example 1, 130 g of the hydrogenated petroleum resin having a resin concentration of 99% by mass was placed in a 200 mL separable flask, and the inside of the system was purged with nitrogen. Nitrogen was flowed at 5.3 VVM, and the pressure of the inside of the system was set to 3 kPa. Then, the temperature was increased to 240° C. at 8° C./min. Then, stripping was performed for 45 minutes at a temperature of 240° C., a pressure of 3 kPa, 5.3 VVM, and a stirring rate of 200 rpm. The results are shown in Table 1.

Example 6

Production Example of Hydrogenated Petroleum Resin (6)

A hydrogenated petroleum resin was produced in the same manner as in Example 1 except for the deodorization step.

That is, a hydrogenated petroleum resin having a resin concentration of 99% by mass was obtained in the same manner as in Example 1, 1300 g of the hydrogenated petroleum resin having a resin concentration of 99% by mass was placed in a 2 L separable flask, and the inside of the system was purged with nitrogen. The amount of the resin placed relative to the vessel volume was to be brought in line with that of other Examples. The device was geometrically similar. Nitrogen was flowed at 5.3 VVM. Then, the temperature was increased to 190° C. at 8° C./min. Then, stripping was performed for 45 minutes at a temperature of 190° C., a pressure of 101.3 kPa, 5.3 VVM, and a stirring rate of 1150 rpm. The results are shown in Table 1.

Comparative Example 1

Production Example of Hydrogenated Petroleum Resin (7)

A hydrogenated petroleum resin was produced in the same manner as in Example 1 except for the deodorization step.

That is, a hydrogenated petroleum resin having a resin concentration of 99% by mass was obtained in the same manner as in Example 1, and the hydrogenated petroleum resin having a resin concentration of 99% by mass was subjected to evaporation at a temperature of 250° C., a pressure of 0.3 kPa, a rotation speed of 150 rpm and a flow rate of 80 mL/min in the evaporation part of the thin film evaporator. A thin film evaporator having an evaporation part made of borosilicate glass and an evaporation area of 0.1 m² was used as the thin film evaporator. The wiper used was contact type and scraping down manner. The results are shown in Table 1.

Comparative Example 2

Production Example of Hydrogenated Petroleum Resin (8)

A hydrogenated petroleum resin was produced in the same manner as in Example 1 except for the deodorization step.

That is, a hydrogenated petroleum resin having a resin concentration of 99% by mass was obtained in the same manner as in Example 1, 130 g of the hydrogenated petroleum resin having a resin concentration of 99% by mass was placed in a 200 mL separable flask, and the inside of the system was purged with nitrogen. Nitrogen was flowed at 0.8 VVM, and the pressure of the inside of the system was set to 20 kPa. Then, the temperature was increased to 190° C. at 8° C./min. Then, stripping was performed for 45 minutes at a temperature of 190° C., a pressure of 20 kPa, 0.8 VVM, and a stirring rate of 200 rpm. The results are shown in Table 1.

Comparative Example 3

Production Example of Hydrogenated Petroleum Resin (9)

A hydrogenated petroleum resin was produced in the same manner as in Example 1 except for the deodorization step.

That is, a hydrogenated petroleum resin having a resin concentration of 99% by mass was obtained in the same manner as in Example 1, 130 g of the hydrogenated petroleum resin having a resin concentration of 99% by mass was placed in a 200 mL separable flask, and the inside of the system was purged with nitrogen. Nitrogen was flowed at 46.1 VVM, and the pressure of the inside of the system was set to 3 kPa. Then, the temperature was increased to 190° C. at 8° C./min. Then, stripping was performed for 60 minutes at a temperature of 190° C., a pressure of 3 kPa, 46.1 VVM, and a stirring rate of 1200 rpm. The results are shown in Table 1.

As shown in Table 1, when volatile components were removed using only a thin film evaporator (Comparative Example 1), the softening point was higher than 105° C. which is the upper limit of the temperature range suitable for exhibiting the adhesive performance. In addition, the deodorization effect was low.

When the hydrogenated petroleum resin was stripped at a gas flow rate of 0.8 VVM (Comparative Example 2), the efficiency of removing odor components was poor. When the hydrogenated petroleum resin was stripped at a gas flow rate of 46.1 VVM (Comparative Example 3), the softening point was higher than 105° C. which is the upper limit of the temperature range suitable for exhibiting the adhesive performance.

Meanwhile, when the hydrogenated petroleum resin was stripped at a gas flow rate of 1 to 45 VVM (Examples 1 to 6), the softening point fell within the range of 90 to 105° C., and the concentration of each odor component having a molecular weight of 300 or less was 100 ppm or less.

Thus, it found that by stripping a hydrogenated petroleum resin at a gas flow rate of 1 to 45 VVM, an excessive increase in the softening point could be suppressed and the hydrogenated petroleum resin can be deodorized.

The invention claimed is:

1. A method for deodorizing a hydrogenated petroleum resin, the hydrogenated petroleum resin comprising a dicyclopentadiene/vinyl aromatic compound hydrogenated resin and volatile components, the method comprising:
   hydrogenating a dicyclopentadiene/vinyl aromatic compound polymer in a solvent;
   removing the solvent to obtain a dicyclopentadiene/vinyl aromatic compound hydrogenated resin comprising volatile compounds;
   blowing a stream of gas inert to the dicyclopentadiene/vinyl aromatic compound hydrogenated resin into the hydrogenated petroleum resin at a gas flow rate of 1 VVM to 45 VVM; and
   removing the gas stream with the volatile components from the hydrogenated petroleum resin; wherein

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Drying method | Stripping | Stripping | Stripping | Stripping | Stripping | Stripping | Thin film | Stripping | Stripping |
| Size of device | 0.2 L | 0.2 L | 0.2 L | 0.2 L | 0.2 L | 2 L | 0.1 m$^2$ (heat transfer area) | 0.2 L | 0.2 L |
| Gas species | Nitrogen | Nitrogen | Nitrogen | Nitrogen | Nitrogen | Nitrogen | — | Nitrogen | Nitrogen |
| Mz | 1830 | 1760 | 1830 | 1830 | 1830 | 1830 | 1830 | 1830 | 1830 |
| Mw/Mn | 2.29 | 1.99 | 2.29 | 2.29 | 2.29 | 2.29 | 2.29 | 2.29 | 2.29 |
| Temperature [° C.] | 190 | 200 | 190 | 160 | 240 | 190 | 250 | 190 | 190 |
| Pressure [kPa] | 3 | 3 | 3 | 3 | 3 | 101.3 | 0.3 | 20 | 3 |
| Time [min] | 45 | 45 | 80 | 45 | 45 | 45 | 0.5 | 45 | 60 |
| Stirring rate [rpm] | 200 | 200 | 0 | 200 | 200 | 1150 | 150 | 200 | 1200 |
| Gas flow rate (VVM) [/min] | 5.3 | 5.3 | 14.1 | 30.0 | 5.3 | 5.3 | — | 0.8 | 46.1 |
| Softening point [° C.] | 97 | 94 | 105 | 95 | 95 | 95 | 108 | 93 | 110 |
| Odor component (Max) [ppm] | 50 or less | 40 or less | 50 or less | 20 or less | 60 or less | 50 or less | 210 or less | 610 or less | 10 or less | the temperature of the hydrogenated petroleum resin is maintained at a temperature of from 150° C. to 250" while the stream of gas is blown, and a softening point of the dicyclopentadiene/vinyl aromatic compound hydrogenated resin is from 90° C. to 105° C.

2. The method for deodorizing a hydrogenated petroleum resin according to claim 1, wherein the temperature of the hydrogenated petroleum resin is maintained at a temperature of 160 to 240° C. while the stream of gas is blown.

3. The method for deodorizing a hydrogenated petroleum resin according to claim 1, wherein the gas flow rate is from 5 VVM to 30 VVM.

* * * * *